（12）United States Patent
Scano et al.

(10) Patent No.: US 7,788,368 B1
(45) Date of Patent: Aug. 31, 2010

(54) MULTICAST CONTENT USAGE DATA COLLECTION AND ACCOUNTING

(75) Inventors: John C. Scano, Dracut, MA (US); David Blease, Holliston, MA (US); Eric L. Peterson, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2015 days.

(21) Appl. No.: 10/744,117

(22) Filed: Dec. 23, 2003

(51) Int. Cl.
*G06F 15/173* (2006.01)
*G06F 15/16* (2006.01)

(52) U.S. Cl. ...................... 709/224; 709/228
(58) Field of Classification Search ................. 709/228, 709/224
See application file for complete search history.

(56) References Cited

U.S. PATENT DOCUMENTS

| | | | | |
|---|---|---|---|---|
| 6,351,467 | B1 * | 2/2002 | Dillon | 370/432 |
| 6,760,748 | B1 * | 7/2004 | Hakim | 709/204 |
| 7,002,971 | B1 * | 2/2006 | Enns et al. | 370/401 |
| 7,047,288 | B2 * | 5/2006 | Cooper et al. | 709/223 |
| 7,305,696 | B2 * | 12/2007 | Thomas et al. | 725/114 |
| 2001/0014103 | A1 * | 8/2001 | Burns et al. | 370/429 |
| 2002/0061021 | A1 * | 5/2002 | Dillon | 370/390 |
| 2002/0095454 | A1 * | 7/2002 | Reed et al. | 709/201 |
| 2003/0028632 | A1 * | 2/2003 | Davis | 709/224 |
| 2004/0049598 | A1 * | 3/2004 | Tucker et al. | 709/246 |
| 2004/0083299 | A1 * | 4/2004 | Dietz et al. | 709/230 |
| 2004/0103120 | A1 * | 5/2004 | Fickle et al. | 707/104.1 |
| 2005/0004978 | A1 * | 1/2005 | Reed et al. | 709/203 |
| 2005/0071739 | A1 * | 3/2005 | Gava | 715/500 |
| 2006/0223495 | A1 * | 10/2006 | Cassett et al. | 455/405 |

* cited by examiner

*Primary Examiner*—Benjamin R Bruckart
*Assistant Examiner*—Shaq Taha
(74) *Attorney, Agent, or Firm*—Shumaker & Sieffert, P.A.

(57) ABSTRACT

Techniques are described for multicast content usage data collection and accounting within a network device. For example, the network device, such as a router, comprises an interface card to receive requests from one or more consumer devices. The requests specify actions concerning multicast content. The requests may include a join request that allows a consumer to join a multicast group and consume content provided by that group, a leave request that allows a user to leave a multicast group and the like. The network device further includes a routing engine to asynchronously collect the requests and create a multicast usage report. The multicast usage report describes multicast content usage by each of the consumer devices. Content providers may access the usage report and derive accounting information from the usage report to update consumer accounts based on the derived accounting information.

12 Claims, 6 Drawing Sheets

MULTICAST CONTENT USAGE DATA COLLECTION AND ACCOUNTING

TECHNICAL FIELD

The invention relates to computer networks and, more particularly, to data collection and accounting within computer networks.

BACKGROUND

A computer network is a collection of interconnected computing devices that exchange data and share resources. There exist a number of approaches for communicating the data between the computing devices within the network. One approach makes use of multicast addresses allowing a transmitting computing device to send data to a group of one or more recipient computing devices. The transmitting device assigns a multicast address to the data enabling each computing device of the group to receive a copy of the data.

One common usage for multicast communication is the distribution of multimedia content over a computer network, such as the Internet. For example, content providers may utilize multicast communications to distribute multimedia content to the recipient devices, also referred to as "consumers." Example content that is often distributed using multicast communications includes local area network television (LAN TV), desktop conferences, corporate broadcasts, music and video web casts, and other forms of multimedia content.

Consumers may switch between different multicast content provided by a content provider or multiple content providers by submitting "multicast action requests." In particular, the multicast action requests allow consumers to join and leave the various multicast group associated with the multicast addresses. An exemplary protocol for issuing multicast action requests, such as a join request, is the Internet Group Management Protocol (IGMP). The consumers are typically allowed to switch at any time, which leads to a form of network-based "channel hopping." In other words, a consumer may switch between multicast broadcasts in a manner similar to switching between channels on a conventional television.

Typically, the content providers make use of a public network, such as the Internet, to distribute the multicast content to the consumers. The consumers may be geographically distributed from the content providers and from each other, and typically access the public network by respective service providers. The service providers provide the infrastructure, such as routers, land lines and the like, that provide access to the public network.

In the context of multicast communications, the service providers mediate the interactions, i.e., multicast action requests, between the consumers and the content providers. More specifically, the service providers service the multicast action requests issued by the corresponding consumers to which they provide network access. Consequently, the service providers manage multicast groups associated with their respective consumers, and distribute multicast content received from the content providers to their respective consumers. As a result, the content providers generally do not have access to detailed information pertaining to multicast content usage by consumers. As a result, it is often difficult for the service providers to maintain an accurate accounting of content usage by the consumers, especially in view of the possible channel hopping that may occur.

SUMMARY

In general, techniques are described for tracking multicast content usage by consumers. More specifically, edge routers located within the service provider networks asynchronously collect data describing the multicast action requests issued by the consumers. Based on the collected data, the edge routers generate multicast usage reports. As described, the multicast usage reports detail consumer usage of content provided by the remote content providers. The service provider networks may provide the multicast usage reports to content providers for billing and consumer accounting purposes.

For example, the service edge routers may provide the multicast usage reports to the content providers via communication servers, such as FTP servers, located within the service provider networks. Upon generating the multicast usage reports, the edge routers upload the reports to the communication servers for communication to the content providers. Accounting servers associated with the content providers may, for example, download the multicast usage reports for processing. Based on the reports, the accounting servers determine fine-grain content usage information for the consumers, and update respective consumer accounts for the consumers. Content providers may then generate invoices or otherwise charge each consumer based on actual content usage, as well as provide detailed information regarding that usage to the consumers on their respective invoices or statements.

In one embodiment, the invention is directed to a method comprising receiving requests specifying actions associated with multicast content transmitted by a content provider, collecting the requests within a network device, and generating a multicast usage report based on the collected requests.

In another embodiment, the invention is directed to a router comprising an interface card to process requests specifying actions concerning multicast content for a multicast device and a control unit to generate a multicast usage report based on the collected request.

In another embodiment, the invention is directed to a method comprising accessing a usage report from a service provider, wherein the usage report describes the use of multicast content provided by a content provider, translating the usage report into accounting information that may be imported into an accounting system, and processing the accounting information with the accounting system to update an account associated with a multicast consumer based on the accounting information.

In another embodiment, the invention is directed to a system comprising an accounting server to access a usage report from a service provider, wherein the usage report describes the use of multicast content provided by a content provider, wherein the accounting server translates the usage report into accounting information that may be imported into an accounting system, and a billing server to process the accounting information and update an account associated with a multicast consumer based on the accounting information.

In another embodiment, the invention is directed to a computer-readable medium comprising instructions to cause a processor to receive requests specifying actions associated with multicast content transmitted by a content provider, collect the requests within a network device, and generate a multicast usage report based on the collected requests.

In another embodiment, the invention is directed to a computer-readable medium comprising instructions to cause a processor to access a usage report from a service provider, wherein the usage report describes the use of multicast content provided by a content provider, translate the usage report into accounting information that may be imported into an accounting system, and process the accounting information with the accounting system to update an account associated with a multicast consumer based on the accounting information.

The techniques may provide one or more advantages. For example, the multicast usage reports provided to the content providers by the service provider networks may allow the content providers to accurately determine customer usage of the multicast content, even for relatively short-time channel viewing. As a result, the content providers may be able to charge the consumers based on actual usage, including for periods of relatively short content usage. As a result, content providers may achieve increased revenues due to more accurate usage-based consumer billing. In addition, the detailed accounting reports generated by the service provider networks may allow service providers to achieve increased revenues derived from the content providers.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
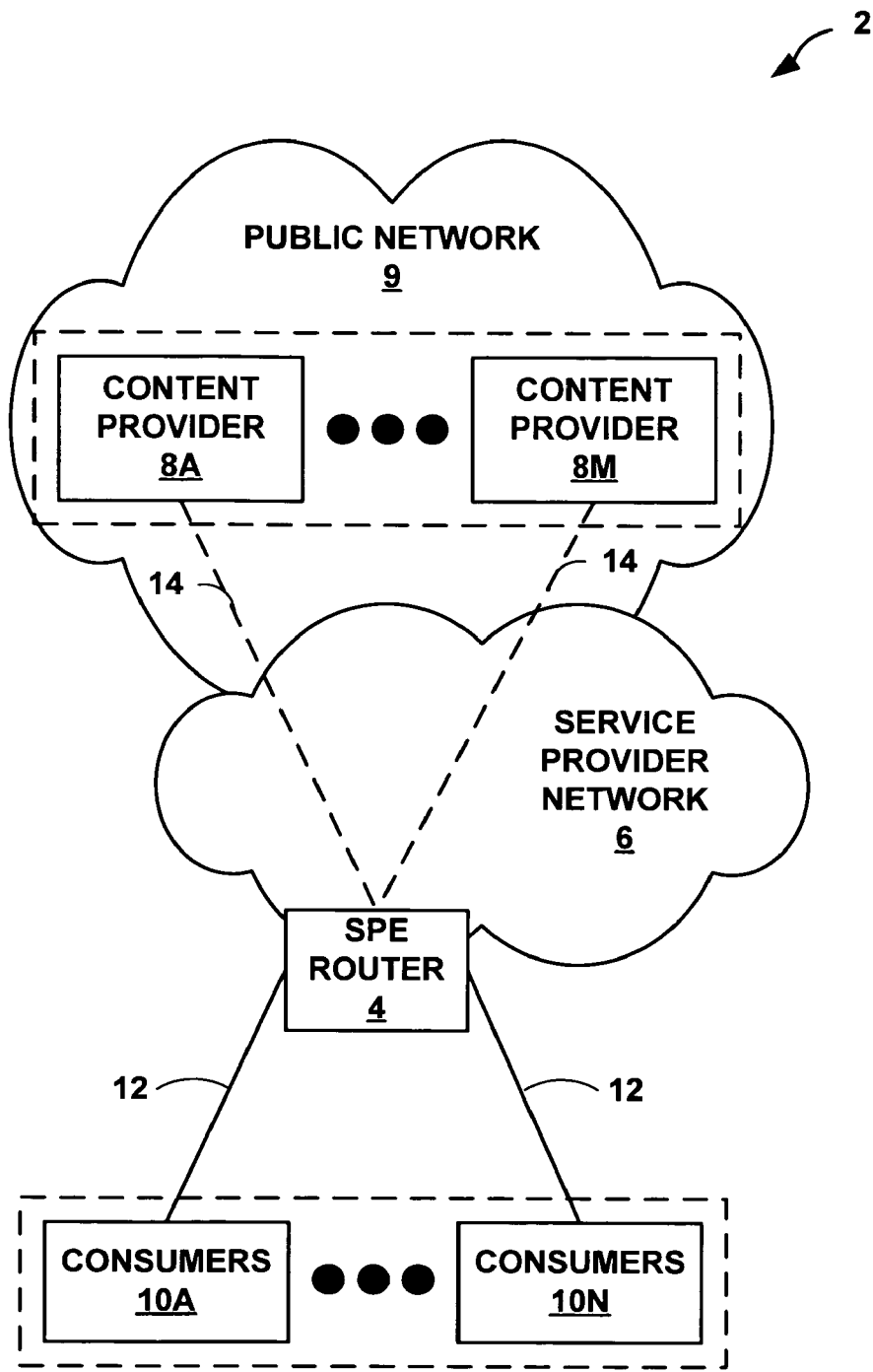
FIG. 1 is a block diagram illustrating an example system in which a provider edge router tracks multicast content usage in accordance with the principles of the invention.

FIG. 1 is a block diagram illustrating an example system 2 in which a service provider edge ("SPE") router 4 tracks multicast content usage in a manner consistent with the principles of the invention. In the illustrated example of FIG. 1, SPE router 4 is an edge router of a service provider network 6 administered by a network service provider, and provides connectivity between content providers 8A-8M (collectively, "content providers 8") and consumers 10A-10N (collectively, "consumers 10"). In particular, SPE router 4 provides consumers 10 connectivity to public network 9 via links 12 and service provider network 6. Public network 9 may comprise one or more interconnected autonomous systems, and provides network-based connectivity between content providers 8 and service provider network 6. Each of content providers 8 and consumers 10 may include one or more computing devices (not shown), such as personal computers, laptop computers, handheld computers, workstations, servers, switches, or other computing devices.

Service provider network 6 may be coupled to one or more networks administered by other providers, and may thus form part of a large-scale public network infrastructure, i.e., public network 9. Service provider network 6 may include a variety of network devices, such as routers, switches, servers, and the like. The configuration of system 2 illustrated in FIG. 1 is merely exemplary. For example, one or more of content providers 8 may be located within service provider network 6.

Content providers 8 each provide content, such as internet protocol (IP) video services, desktop conferences, corporate broadcasts, or other content, to consumers 10. For example, content provider 8A may provide content in the form of multicast packets 14 to a group to which consumers 10A and 10N have joined. Each multicast data packet includes a multicast address that identifies the respective multicast group. SPE router 4 maintains information associating the member consumers 10A and 10N with the group, and transmits the multicast data packets 14 from content provider 8A to the member consumers.

Consumers 10 interact with SPE router 4 via the Internet Group Management Protocol (IGMP) or some other multicasting protocol to issue multicast action requests. Consumers 10 may, for example, issue a join or leave multicast action request to join or leave a multicast group, respectively. In the above example, consumer 10A and 10N issue multicast joins to become members of the exemplary multicast group to which SPE router 4 delivers multicast data packets 14. Consumer 10A may issue a multicast action request to leave the group, thereby terminating content delivery from SPE router 4. In similar manner, consumers 10 may issue multicast action requests to SPE router 4 to switch between multicast groups, allowing consumers 10 to access different content provided by content providers 8.

In accordance with the principles of the invention, SPE router 4 collects data and accounting information detailing the multicast action requests, i.e., the joining and leaving of groups, made by consumers 10. SPE router 4 may further generate a report based on the tracked multicast action requests, i.e., a multicast usage report. In providing this report to content providers 8, content providers 8 may track the usage of the multicast content by each of consumers 10. For example, the report may indicate that consumer 10A accessed content provided by content provider 8B for two hours and content provided by content provider 8F for six hours. Thus, service providers running service provider network 6 may present the option to content providers 8 for billing consumers 10 based on the usage of multicast content, thereby obtaining a competitive advantage over other service providers. Content providers 8 may also benefit as revenue may increase under usage-based billing.

Figure 2:
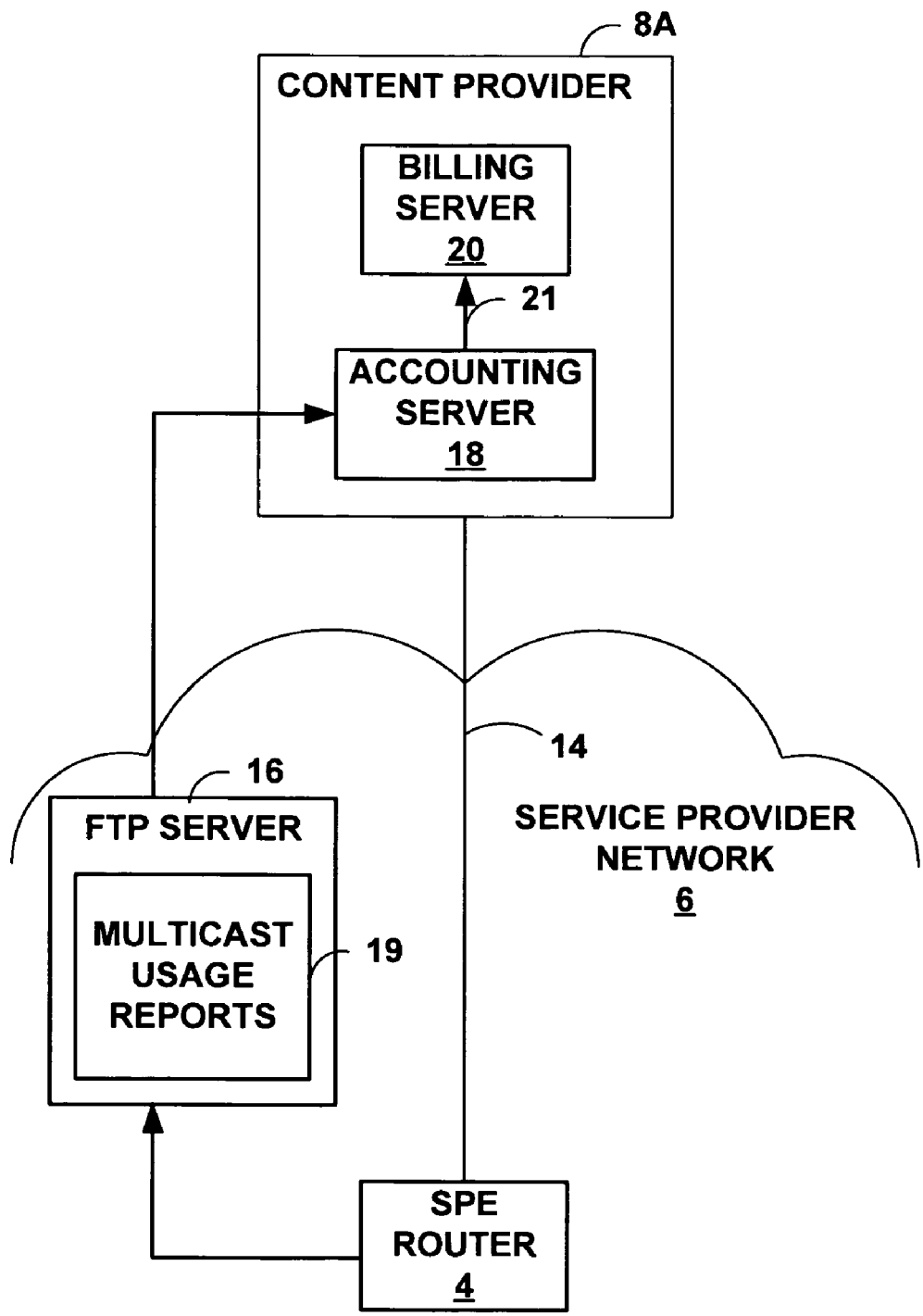
FIG. 2 is a block diagram illustrating portions of FIG. 1 in further detail.

FIG. 2 is a block diagram illustrating an exemplary portion of system 2 of FIG. 1 in further detail. In particular, FIG. 2 illustrates SPE router 4 delivering multicast usage reports 19 to content provider 8A in accordance with the principles of the invention. In the exemplary embodiment of FIG. 2, SPE router 4 receives multicast addressed packets 14 from content provider 8A and delivers the multicast packets to consumers 8 (FIG. 1), as discussed above. SPE router 4 communicates multicast usage reports 19 to a communication server, e.g., FTP server 16, in accordance with a communication protocol, such as the File Transfer Protocol (FTP). Service provider network 6 provides external access to FTP server 16 to allow content provider 8A access to multicast usage reports 19 generated by SPE router 4. Through interactions with FTP server 16, SPE router 4 may upload multicast usage reports 19 for download by content provider 8A.

More specifically, accounting server 18 of content provider 8A downloads multicast usage reports 19 from FTP server 16 in accordance with the communication protocol. Accounting server 18 may, for example, periodically open an FTP session with FTP server 16 and download one or more multicast usage reports 19. Accounting server 18 may invoke an automated script to automatically open the session and retrieve multicast usage reports 19.

Upon downloading one or more of multicast usage reports 19, accounting server 18 processes the multicast usage actions detailed within the downloaded reports. In particular, accounting server 18 may process the multicast usage reports to generate accounting information based on the usage of content by consumers 10. SPE router 4 may generate multicast usage reports 19 in a format that may not be suitable for efficient extraction of accounting information. For example, multicast usage reports 19 may list chronologically join and leave actions issued by consumers 10. Accounting server 18 may translate the reports into a format that groups the join and leave actions issued by each of consumers 10. Moreover during translation, accounting server 18 may parse the translated multicast usage report 18 to reveal accounting information for each of consumers 10. Specifically, accounting server 18 may extract usage information for each of consumers 10 that joined a group provided by content provider 8A.

Accounting server 18 transmits usage information 21 to billing server 20 for each of consumers 10 that joined a group provided by content provider 8A. Billing server 20 manages billing information for each of consumers 10 that consume content provided by content provider 8A. Billing server 20 enters usage information 21 for each of consumers 10 into the respective accounts of consumers 10 stored within billing server 20. Content provider 8A may then provide each of consumers 10 detailed invoices or statements listing their specific usage of multicast content provided by content provider 8A. As a result, service provider network 6 and, more particularly, multicast usage reports 19 allow content provider 8A to offer usage-based billing of multicast content. Moreover, consumers 10 may view the usage of multicast content listed within their respective statements or invoices to check any errors in billing that may occur.

In general, accounting server 18 may translate any reports originating from any asynchronous protocol, and the techniques described herein are not limited to multicast protocols. Further, while shown in terms of a single content provider, content provider 8A of FIG. 2, multiple content providers may access FTP server 16 to download corresponding multicast usage reports 19. For example, each of content providers 8 (FIG. 1) may access FTP server 16 to download one or more multicast usage reports. Moreover, service provider network 6 may maintain multiple FTP servers similar to FTP server 16. SPE router 4 may couple to each of these FTP servers and upload multicast usage reports to each of the multiple FTP servers. Multiple FTP servers may allow a large number of content providers 8 to quickly access multicast usage reports 19. Furthermore, other communication servers besides an FTP server, such as a Trivial File Transfer Protocol (TFTP) server and a web server, may store multicast usage reports 19. SPE router 4 may communicate multicast usage reports 19 to these servers in accordance with the Trivial File Transfer Protocol and Hyper Text Transfer Protocol, respectively.

SPE router 4 may generate each of the multicast usage reports to correspond to a respective one of content providers 8. In particular, each of the multicast usage reports may contain multicast usage information for a respective one of content providers 8. Moreover, FTP server 16 may separately and securely maintain the multicast usage reports so that each of content providers 8 may access only their respective reports. In this manner, content providers 8 are only able to access usage and accounting information related to delivery of their content to consumers 10.

Although illustrated separately for exemplary purposes, accounting server 18 and billing server 20 may comprise a single computing device. Moreover, content provider 8A may comprise a plurality of accounting servers and/or a plurality of billing servers depending on the number of customers 10 served and other such factors. Content provider 8A may also include capacity planning servers that use multicast usage reports 19 for content capacity planning purposes. The capacity planning servers may translate multicast usage reports 19 into usage data and provide content provider 8A with usage information pertinent to capacity problems. Content providers 8A may include one or more capacity planning servers, one or more accounting servers, or any combination thereof. However, for ease of illustration, the invention is discussed above in the context of accounting servers.

Similarly, although FTP server 16 and SPE router 4 are illustrated as separate entities, their functionality can be combined into a single entity. For example, SPE router 4 may simply store multicast usage reports locally. Downloading reports from SPE router 4 to content providers 8 may then be initiated by either SPE router 4 or content providers 8.

Figure 3:
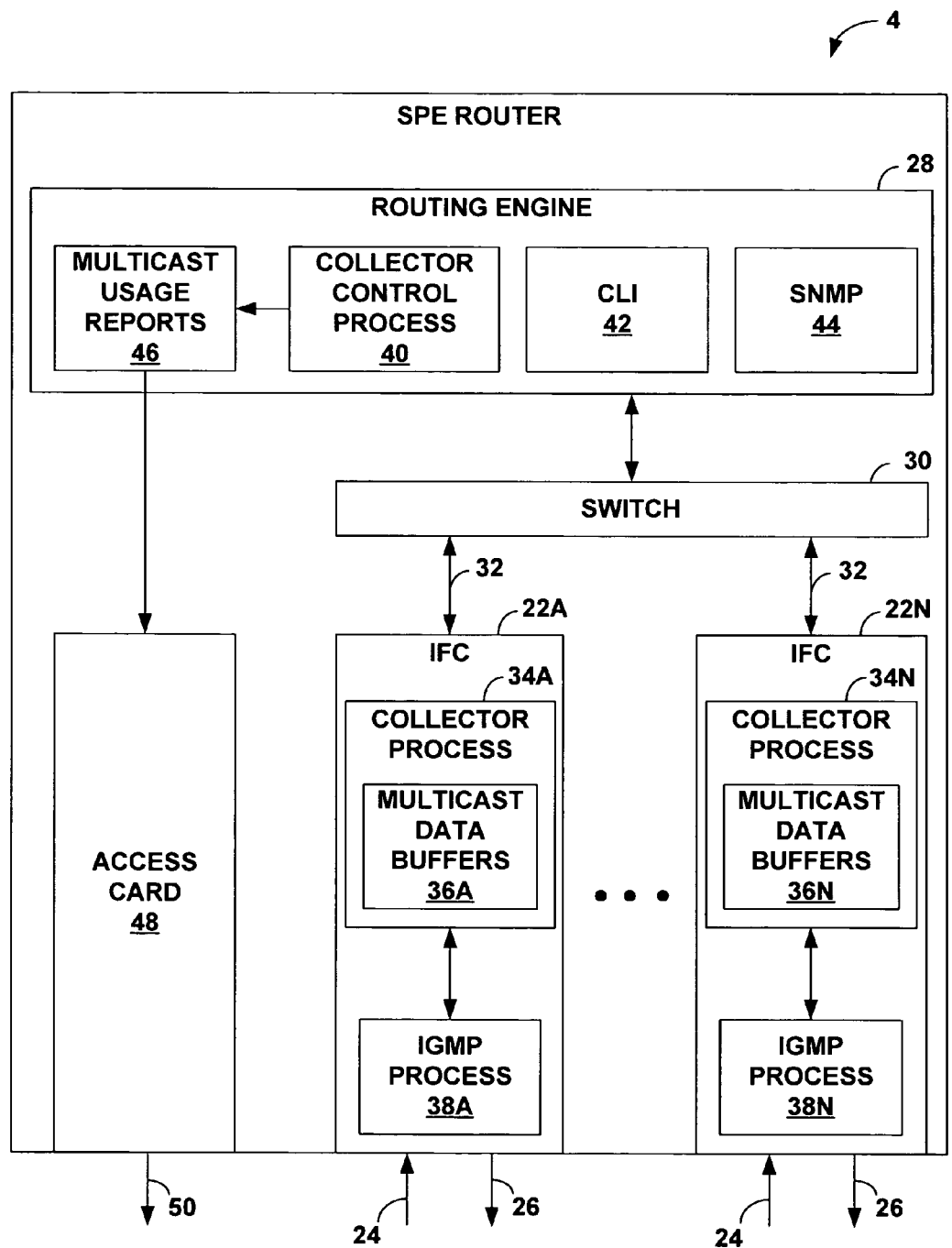
FIG. 3 is a block diagram illustrating an exemplary embodiment of a router that tracks multicast content usage in accordance with the principles of the invention.

FIG. 3 is a block diagram illustrating an exemplary embodiment of a router, e.g., SPE router 4, that tracks multicast content usage in accordance with the principles of the invention. In the exemplary embodiment of FIG. 3, SPE router 4 includes interface cards 22A-22N (collectively, "IFCs 22") that receive and send packet flows via network links 24 and 26, respectively. SPE router 4 may include a chassis (not shown) having a number of slots for receiving a set of cards, including IFCs 22. Each card may be inserted into a corresponding slot of the chassis for electrically coupling the card to routing engine 28 via high-speed switch 30 and internal data paths 32.

Switch 30 also provides an interconnect path between each of IFCs 22. Switch 30 may comprise, for example, switch fabric, switchgear, a configurable network switch or hub, or other high-speed switching mechanisms. Internal data paths 32 may comprise any form of communication paths, such as electrical paths within an integrated circuit, external data busses, optical links, network connections, wireless connections, or other communication paths. IFCs 22 may be coupled to network links 24, 26 via a number of interface ports (not shown).

In general, routing engine 28 operates as a control unit for SPE router 4, and maintains routing data that reflects a topology of a network, e.g., service provider network 6 of FIG. 1. Based on the routing data, routing engine 28 generates forwarding data for IFCs 22. Each of the IFCs 22 forwards packets in accordance with the forwarding data generated by routing engine 28. Specifically, IFCs 22 determines a next hop for each inbound packet based on the forwarding information, identifies a corresponding one of the IFCs associated with the next hop, and relays the packet to the appropriate one of IFCs 22 via switch 30 and data paths 32.

In addition to this general routing functionality, IFCs 22 comprise respective IGMP processes 38A-38N (collectively, "IGMP processes 38"), and collector processes 34A-38N (collectively, "collector processes 34") for managing multicast data buffers 36A-36N (collectively, "multicast data buffers 36"). As described in further detail below, IGMP processes 38 implement the IGMP protocol for communicating with consumers 10 regarding delivery of multicast content. Collector processes 38 asynchronously collect and maintain data and accounting information for delivery of multicast content via their respective one of IFCs 22.

Routing engine 28 executes a collector control process 40, a command line interface (CLI) 42 and the Simple Network Management Protocol (SNMP) 44. CLI 42 allows a user to interact with SPE router 4 by entering commands in accordance with a pre-defined syntax. Furthermore, routing engine 28 supports SNMP 44 for general communication with a remote user or agent for management and configuration of SPE router 4.

Collector control process 40 is responsible for managing distributed collector processes 34 executing within IFCs 22. In particular, collector control process 40 configures and directs each of collector processes 34 to collect multicast usage information. Collector control process 40 generates multicast usage report 46 based on information gathered from collector processes 34.

More specifically, collector control process 40 issues configuration commands to collector processes 34 to define the type of data that collector processes 34 should collect. Collector processes 34 may collect data relating to a number of protocols, including IGMP, and data corresponding to various properties of IFCs 22, such as system variables, stack statuses, or other properties. In some embodiments, collector control process 40 configures a collection interval or other such data collection properties defined by a data collection schema. Collector control process 40 may issue a configuration command that causes collector processes 34 to start or stop collecting data in accordance with the data collection schema, or switch to a different data collection schema. In this manner, data collection schemas enable SPE router 4 to quickly and efficiently configure IFCs 22 to gather assorted types of multicast usage data and any other network management data.

In accordance with the principles of the invention, SPE router 4 supports an IGMP schema as one type of data collection schema. More particularly, collector processes 34 may collect data in accordance with the IGMP schema defined by collector control process 40. The IGMP schema allows collector processes 34 to perform data collection of IGMP actions, including the join and leave multicast actions discussed above. Moreover, collector processes 34 may monitor other data associated with IGMP actions, including an IP interface, a lower interface, a router index, a destination address, a source address, a multicast group, other IGMP commands, a time stamp or other data.

The IP interface indicates the index of the IP interface on one of IFCs 22 that received the IGMP message, i.e., IGMP protocol data units (PDUs). The lower interface indicates the index of the interface configured below the IP interface. The router index indicates the virtual router/virtual router forwarder index. The destination address indicates the destination IP address associated with the IGMP PDU. The source address indicates the source IP address associated with the IGMP PDU. The multicast group indicates the IP multicast group associated with the IGMP PDU. The IGMP command indicates one of a supported type of IGMP action commands, such as report1, report2, report3, leave, unknown, and group-delete. Report1, report2 and report3 specify various join requests and each of the host reports indicate version of IGMP supported by one of consumers 10. For example, a report1 action command specifies a join request by a host that is compliant with version 1 of IGMP. Report 2 specifies a join request by a host that is compliant with version 2 of IGMP. Report 3 specifies a join request by a host that is compliant with version 3 of IGMP. In this manner, collector control process 40 may specify one or more IGMP commands in accordance with the defined IGMP scheme to specify which IGMP commands collector processes 38 should collect. Finally, time stamp indicates the time one of IFCs 22 received the IGMP PDU.

IGMP processes 38 executing within routing engine 28 interact with consumers 10 via IFCs 22 and links 24, 26. Consumers 10 issue an IGMP PDU specifying one of the IGMP action commands, such as the join action request, as specified by an IGMP host report1, report2 or report3, and a multicast group associated with one of the groups provided by content providers 8. Typically, the multicast communication includes the destination IP address and source IP address, as well as any other necessary information to ensure delivery, to complete the IGMP PDU. IGMP processes 38 receive the commands and process the commands in accordance with IGMP procedure.

Upon configuration and activation of the IGMP schema via collector control process 40, collector processes 34 asynchronously gather multicast usage data from IGMP processes 38 according to the IGMP schema. In other words, collector processes 34 do not poll IGMP processes 38 for data at a set synchronous interval. Instead, collector processes 34 asynchronously receive data from IGMP processes 38 as IGMP actions requests are received and processed from consumers 10, which typically occurs in an asynchronous manner. IGMP processes 38 receive JUMP PDUs from consumers 10, and inform collector processes 34 of the IGMP PDUs. Collector processes 34 receive the IGMP PDUs, and buffer the incoming IGMP PDUs within multicast data buffers 36. Collector processes 34 typically receive binary formatted copies of the IGMP PDUs and extract the multicast usage information from these maintaining the binary format. Collector processes 34 may add a time stamp and other data as specified by the IGMP schema to the copied IGMP PDU. Collector processes 34 may also remove information not specified by the JUMP schema.

In this manner, collector processes 34 distributed within IFCs 22 asynchronously collect data associated with the delivery of multicast content to consumers 10. Collector processes 34 transmit the collected and buffered multicast usage data to collector control process 40 in accordance with a period of time or other parameter specified by the IGMP schema. For example, collector control process 40 may configure collector processes 34 to export the collected multicast usage data from multicast data buffers 36 periodically, e.g., every five minutes, or when a threshold amount of data has been collected.

Collector control process 40 aggregates the multicast usage data received from each of collector processes 34 for which the IGMP schema is activated. The aggregated multicast usage data may, in some embodiments, be reformatted from the binary format to the American Standard Code for Information Interchange (ASCII) format or some other readable text format. The multicast usage reports are not necessarily reformatted and the invention should not be limited in this respect.

Upon aggregating and optionally reformatting the multicast data, collector control process 40 may create new reports from the data, or may append the aggregated multicast data onto one or more of the existing multicast usage reports 46. Collector control process 40 may, in some embodiments, detect when multicast usage report 46 reaches a certain size, or has been stored for a period of time, and transmit multicast usage report 46 via access card 48 and link 50 to FTP server 16 (FIG. 2) or some other device capable of network-based file storage and retrieval.

Via CLI 42, a user may configure one or more of the variables associated with the IGMP schema, activate or inactivate the IGMP schema, view multicast usage reports 46, and generally control the IGMP tracking and accounting features of SPE router 4. SPE router 4 may include various other schemas to track other protocols and system properties. Although discussed in the context of the IGMP for exemplary purposes, SPE router 4 may include various other multicast protocols, such as a Multicast Listener Discovery (MLD) protocol, having similar schemas. SPE router 4 may generate additional multicast usage reports 46 corresponding to these various other schema, and may include usage data resulting from these other multicast protocols in multicast usage reports 46 as controlled by their corresponding schemas. Consequently, one or more of IFCs 22 may include one or more processes that support multicast communication, e.g., IGMP processes 38.

Figure 4:
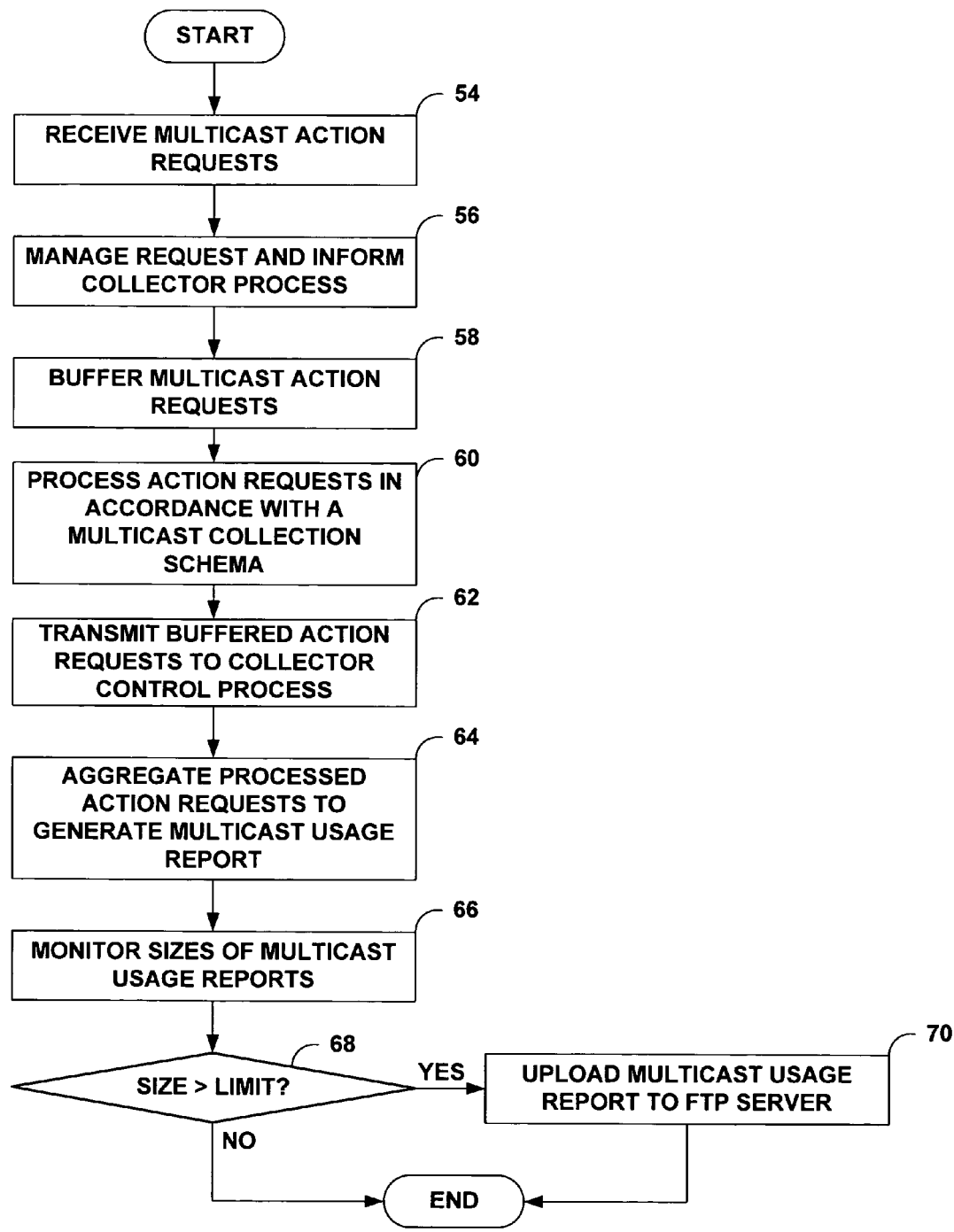
FIG. 4 is a flowchart illustrating example operation of a router that creates a multicast usage report to track content usage by consumers in accordance with the principles of the invention.

The embodiment of SPE router 4 shown in FIG. 4 is illustrated for exemplary purposes. Alternatively, SPE router 4 may have a centralized control unit having a routing engine and a forwarding engine. In this embodiment, forwarding functionality is not distributed to IFCs 22, but centralized within the forwarding engine. One or more of the above described processes, such as controller processes 34, may execute within the centralized forwarding engine. Moreover, the principles of the invention can be realized within a layer three switch for ease of illustration, however, the principles of the invention are illustrated in the context of SPE router 4.

In general, the processes described above, including collector control process 40 and collector processes 34, may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functions of the processes may be implemented by executing the instructions of the computer-readable medium with one or more processors, discrete hardware circuitry, firmware, software executing on a programmable processor, or a combination of any of the above.

FIG. 4 is a flowchart illustrating an example operation of a router, e.g., SPE router 4 of FIG. 1, in creating a multicast usage report that tracks multicast content usage by consumers 10 in accordance with the principles of the invention. Initially, SPE router 4 receives one or more multicast action requests (54). Specifically, for example, IFCs 22 (FIG. 3) of SPE router 4 receives the multicast action requests from consumers 10 via links 24. IGMP processes 38 executing within IFCs 22 manage the requests from consumers 10, and asynchronously inform collector processes 34 upon receiving the multicast action requests (56).

Collector processes 34 buffer incoming multicast action requests (58) as they occur asynchronously. Asynchronous collection of the multicast action requests allows SPE router 4 to handle the random nature of multicast action requests. For example, SPE router 4 may accurately track consumer use when multiple events occur in relatively short time periods, as often happens when consumers 10 switch between multicast groups.

Collector processes 34 process the buffered action requests in accordance with a multicast collection schema defined by collector control process 40, e.g., the IGMP schema described above (60). In some embodiments, SPE router 4 may not define a multicast collection schema. Instead, a user may manually configure SPE router 4 via CLI 42 or some other interface.

Collector processes 34 transmit the buffered multicast action requests to collector control process 40 (62). In some embodiments, collector processes 34 transmit the buffered action requests at a set time interval or when a threshold amount of data is buffered. Collector control process 40 may specify the set time interval as described above.

Collector control process 40 aggregates the processed action requests to generate multicast usage reports 46 (64). One or more of multicast usage reports 46 may be similar to the exemplary multicast usage report discussed in more detail below. Collector control process 40 may also, for example, create new reports from the data, or may append the processed action requests to an existing multicast usage report.

As described above, SPE router 4 may generate each of the multicast usage reports 46 to correspond to a respective one of content providers 8. In particular, each of the multicast usage reports may contain multicast usage information for a respective one of content providers 8. Moreover, FTP server 16 may separately and securely maintain multicast usage reports 46 so that each of content providers 8 may access only their respective reports. In this manner, content providers 8 are only able to access usage and accounting information related to delivery of their content to consumers 10.

In this example, collector control process 40 monitors the respective sizes of multicast usage report 46 (66), and compares the sizes to a pre-set threshold (68). If the size of any of multicast usage reports 46 is larger than the pre-set limit, collector control process 40 uploads the multicast usage report to FTP server 16 via access card 48 and link 50 (70).

SPE router 4 continues to process multicast action requests to generate multicast usage reports 46 as long as the IGMP schema is activated. Furthermore, during collection by collector control process 40, collector processes 34 may continue to receive and track multicast action request in multicast data buffers 36. In this manner, SPE router 4 may continuously track multicast usage by consumers 10 and provide detailed multicast usage reports 46 to content providers 8.

Figure 5:
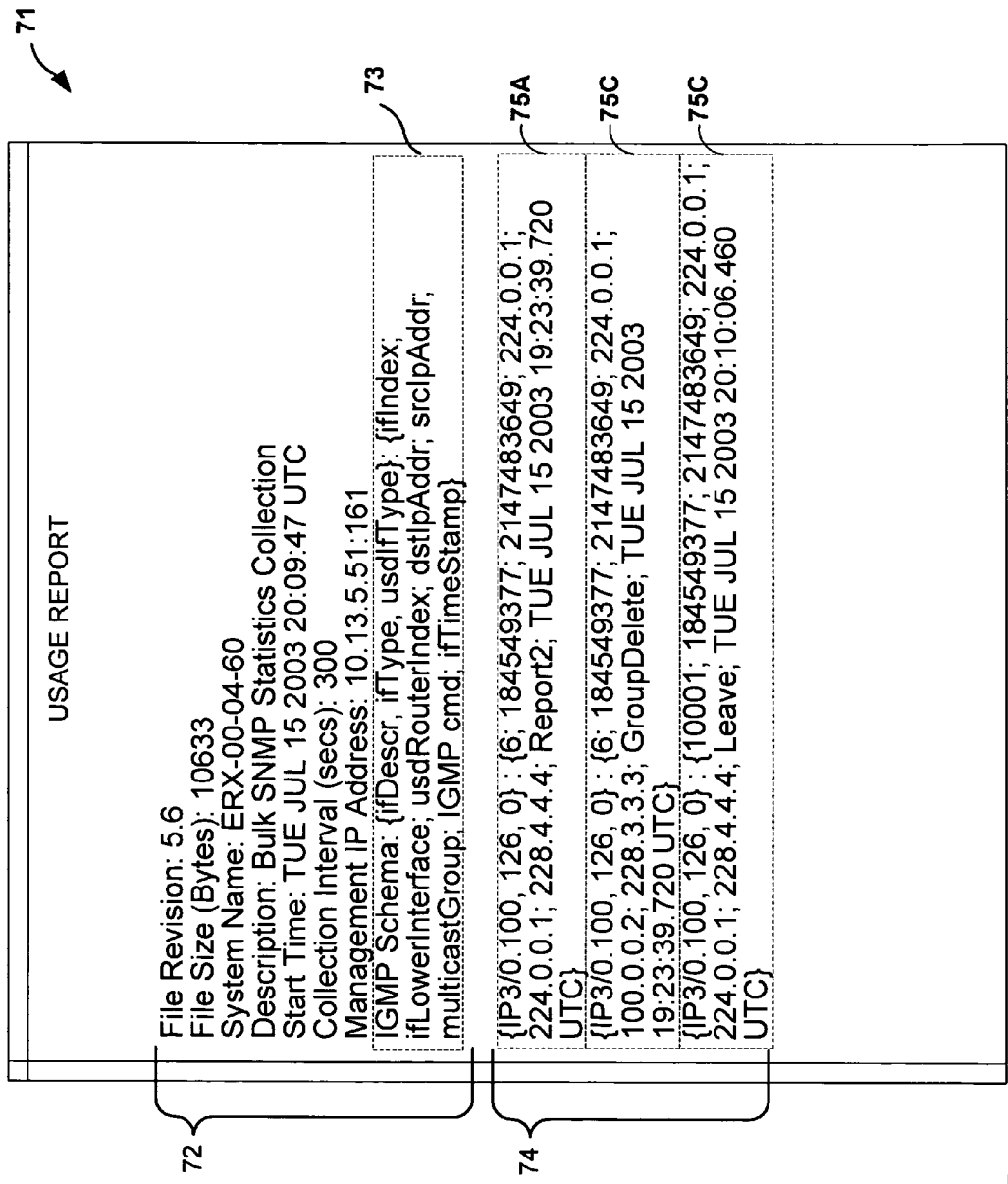
FIG. 5 illustrates an exemplary multicast usage report generated by a router in accordance with the principles of the invention.

FIG. 5 illustrates exemplary multicast usage report 71 generated by SPE router 4 in accordance with the principles of the invention. In this example, multicast usage report 71 includes header 72 and data 74. Header 72 specifies general information pertaining to multicast usage report 71, such as a file revision, a file size, a system name, a description, a start time, a collection interval, a management IP address, and a format 73 of the report. Format 73 of multicast usage report 71 indicates the "IGMP Schema" was used as the multicast collection schema when collecting the multicast usage data described within multicast usage report 71. In addition, format 73 provides a data definition used for each entry of multicast usage report 71. In particular, collector control process 40 inserts the multicast usage information collected by collector processes 34 into data 74 of multicast usage report 71 in accordance with the format specified in header 72. In this example, data 74 includes entries 75A, 75B and 75C, which each correspond to a multicast action request collected by one of collector processes 34. Entry 75A corresponds to a Report2 IGMP multicast action request received at 19:23:39.720 on Jul. 15, 2003. Entries 75B and 75C correspond to GroupDelete and Leave IGM multicast action requests received by SPE router 4 at 19:23:39.720 and 20:10:06.460, respectively, on Jul. 15, 2003.

As discussed in more detail below, accounting server 18 may translate multicast usage report 71 into accounting information for automated processing. Accounting server 18 may examine format 73 specified in header 72 and, based on the specified data definition, automatically translate entries 75A, 75B and 75C as needed for importation into an accounting system, e.g., billing server 20. Accounting server 18 may, for example, parse the file based on certain delineators, such as the curly brackets ('{',}'), comma (,), colon (':') and semicolon (';') characters, to extract relevant usage information based on the provided data definition.

Figure 6:
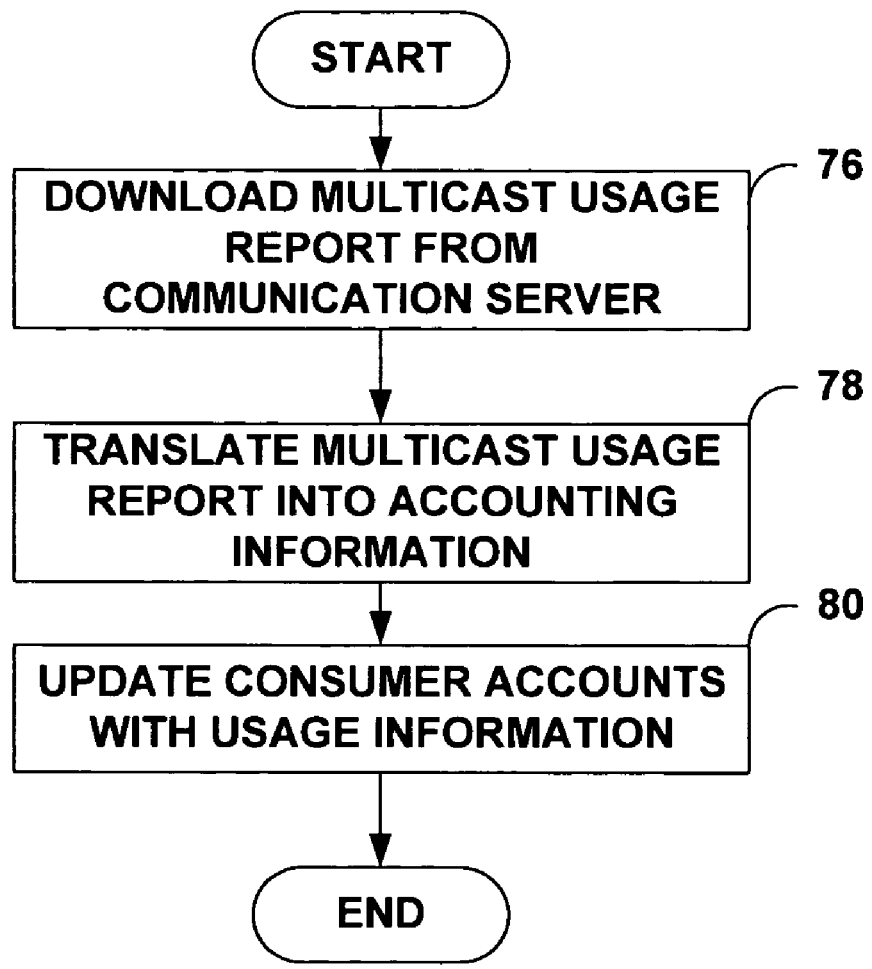
FIG. 6 is a flowchart illustrating example operation of a content provider in processing a multicast usage report generated by a router in accordance with the principles of the invention.

FIG. 6 is a flowchart illustrating example operation of a content provider, e.g., content provider 8A (FIGS. 1 and 2), in processing a multicast usage report generated by a router in accordance with the principles of the invention. Content provider 8A accesses FTP server 16 (FIG. 2) to download one of multicast usage reports 19 (76). The downloaded one of multicast usage reports 19 may be similar to the exemplary multicast usage report 71 shown in FIG. 5.

Upon downloading the multicast usage report, accounting server 18 included within content provider 8A translates the multicast usage report into accounting information (78). For example, accounting server 18 may translate the report from the format shown in FIG. 5, e.g., a chronological list of entries 75A-75C, into accounting information for automated processing by billing server 20. During translation of the multicast usage report, accounting server 18 may parse the multicast usage report based on the self-contained data description, i.e., format 73, to generate usage information for each of consumers 10. Accounting server 18 may parse data 74 using the data definition to extract the usage information. Accounting server 18, for example, may parse entries 75A-75C within data 74 to determine the source IP address, multicast group, action, and time stamp for each of the entries.

Using the source IP address, accounting server 18 may identify one of consumers 10 that issued the corresponding multicast action request. The time stamp and the action may identify whether the identified one of consumers 10 joined or left the specified multicast group. The following example lists information that accounting server 18 may extract from the exemplary multicast usage report 71:

224.0.0.1; 228.4.4.4; Report2; TUE JUL 15 2003 19:23: 39.720 UTC 100.0.0:2; 228.3.3.3; GroupDelete; TUE JUL 15 2003 19:23:39.720 UTC 224.0.0.1; 228.4.4.4; Leave; TUE JUL 15 2003 20:10: 06.460 UTC Each of the three parsed entries listed above identify the source IP address, the multicast group, the action and the time stamp, in that order. Using this information accounting server 18 may for example, identify one of consumers 10 having source IP address 224.0.0.1 that joined multicast group 228.4.4.4 as specified by action "Report2" on Tuesday Jul. 15, 2003 at 19:3:39.720 UTC. Furthermore, accounting server 18 identifies the same consumer having source IP address 224.0.0.1 as leaving multicast group 228.4.4.4 as specified by action "Leave" on Tuesday Jul. 15, 2003 at 20:10:06.460 UTC. Subtracting the second time stamp from the first, accounting server 18 may calculate usage time. In this manner, accounting server 18 generates usage information for each of consumers 10 that used content provided by content provider 8A.

Based on the extracted accounting information, accounting server 18 then updates the consumer accounts associated with each of consumers 10 that subscribed to content provided by content provider 8A (80). Accounting server 18 updates the consumer accounts stored within billing server 20. Content provider 8A, upon having updated consumer accounts, may generate detailed statements or bills for each of consumers 10 that consume content provided by content provider 8A. Service provider network 6, by providing detailed usage reports, may generate additional revenue from content providers 8. Content providers 8 may, in return, charge consumers 10 in a more accurate manner based on usage information provided by service provider network 6.

Various embodiments of the invention have been described. Although the techniques have been described as elements embodied within a network device, the described elements may be distributed to multiple devices. The term "system," is used herein to generally refer to embodiments of the invention in which the described elements are embodied within a single network device or distributed to multiple network devices. These and other embodiments are within the scope of the following claims.

The invention claimed is:

1. An intermediary network device located within a service provider network between a content provider and one or more multicast consumers, the network device comprising:

a control unit to control operation of the network device;

a plurality of interface cards to receive requests from the multicast consumers concerning the consumption of multicast content and, after receiving the requests, the multicast content from the content provider, wherein the plurality of interface cards further forward the received multicast content to the multicast consumers in response to one or more of the requests;

a plurality of collector processes executing on the interface cards to collect the requests and communicate the requests to the control unit of the network device; and a collection control process executing on the control unit to aggregate the requests and generate a multicast usage report based on the collected request received from the collector processes executing on the interface cards, wherein the multicast usage report details usage by the consumers of the multicast content provided by the content provider, wherein the collection control process executing on the control unit of the network device communicates a multicast collection schema to the collector processes executing on the interface cards of the network device, wherein the collector processes collect the requests in accordance with the multicast collection schema, wherein the multicast collection schema defines a set of data collection properties to control collection of the requests by the collector processes, wherein the collection control process issues commands to the collector processes to start and stop collection of the requests in accordance with the multicast collection schema, and wherein the multicast usage report comprises a header and a data segment that includes one or more entries corresponding to the collected requests.

2. The network device of claim 1, wherein the network device comprises one of a router and a layer three switch and the control unit comprises a routing engine.

3. The network device of claim 1, wherein the interface card timestamps the buffered requests to indicate when the requests were received, and the control unit orders the requests within the report in accordance with the timestamps.

4. The network device of claim 1, wherein the collector processes communicate the requests to the collection control process for aggregation at a collection interval defined by the multicast schema.

5. The network device of claim 1, further comprising a user interface to receive configuration input from a user for the network device, wherein the collection control process updates the multicast collection schema in response to the configuration input and communicates the updated multicast collection schema to the collector control processes executing within the interface cards of the network device to change the type of multicast data that the collector processes collects.

6. The network device of claim 1, wherein the multicast usage report identifies multicast content usage by the multicast device.

7. The network device of claim 1, further comprises an access card to transmit the multicast usage report to a file server that is accessible by a content provider.

8. The network device of claim 1, wherein the interface card receives the requests via a multicast protocol, which includes one or more of an Internet Group Management Protocol (IGMP) and a Multicast Listener Discovery (MLD) protocol.

9. The network device of claim 8, wherein actions concerning multicast content include one or more of a join action, a leave action, and a group delete action in accordance with the multicast protocol.

10. The network device of claim 1, wherein the multicast usage report comprises data describing the collected requests, and a data definition that describes a format for the data.

11. The network device of claim 1, wherein the header includes one or more of a file revision, a file size, a system name, a description, a start time, a collection interval, a management IP address, and a format of the file, and a data segment.

12. The network device of claim 1, wherein each entry of the data segment includes one or more of an IP interface, a lower interface, a router index, a destination address, a source address, a multicast group, a multicast action, and a time stamp for the corresponding action request.

* * * * *